F. R. MERRITT.
GUARD FOR STEEL TRAPS.
APPLICATION FILED DEC. 14, 1916.
1,231,406.
Patented June 26, 1917.
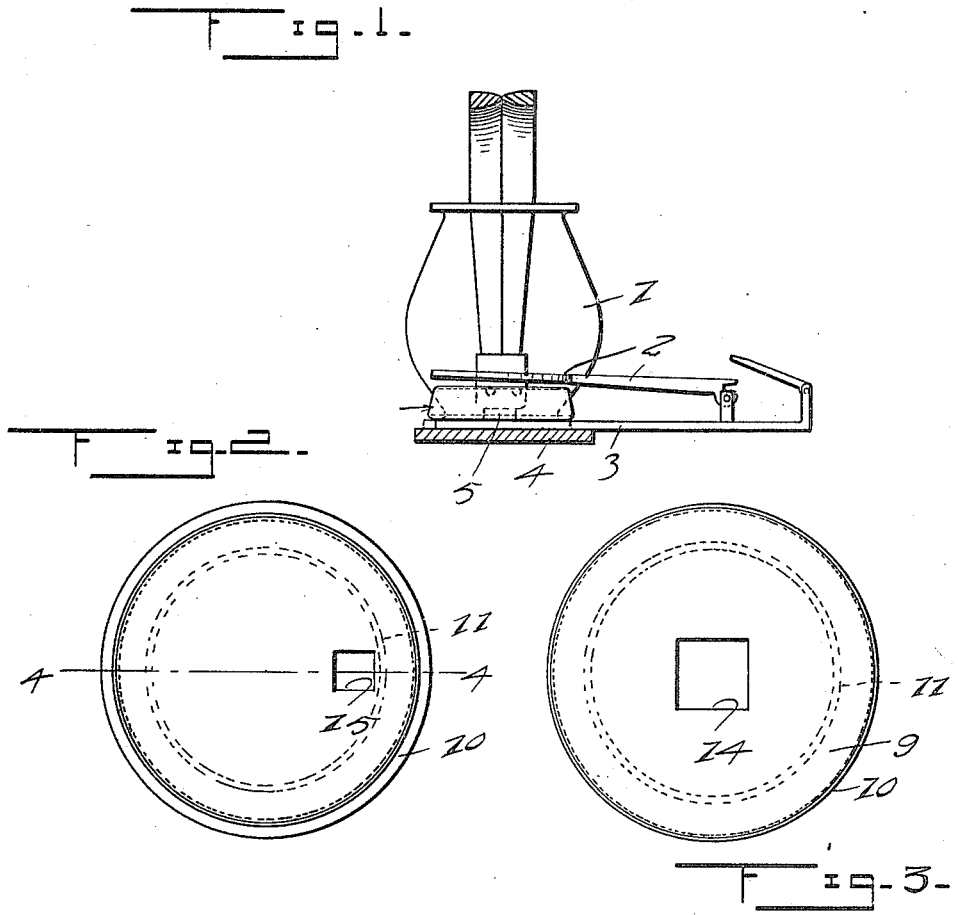
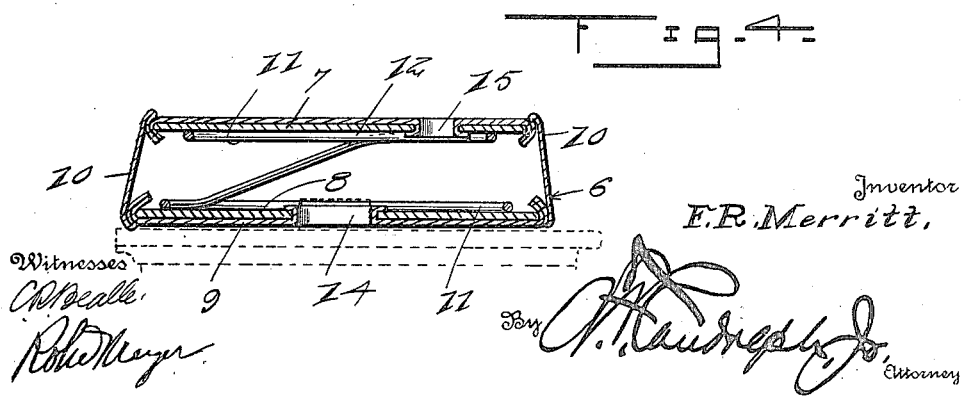

UNITED STATES PATENT OFFICE.

FREDERICK R. MERRITT, OF REDDING, CALIFORNIA.

GUARD FOR STEEL TRAPS.

1,231,406.  Specification of Letters Patent.  Patented June 26, 1917.

Application filed December 14, 1916. Serial No. 136,919.

*To all whom it may concern:*

Be it known that I, FREDERICK R. MERRITT, a citizen of the United States, residing at Redding, in the county of Shasta and State of California, have invented certain new and useful Improvements in Guards for Steel Traps; and I do hereby declare the following to be a full, clear, and exact description of the invention, such as will enable others skilled in the art to which it appertains to make and use the same.

This invention relates to a guard which is constructed for placing beneath the pan of an ordinary steel trap, for preventing the packing of dirt beneath the pan, which would impair the operation of the trap.

The primary object of the invention is to provide a guard as specified, which is composed of an upper and lower plate, held in spaced relation to each other by means of a spring, and to mount a covering, of any suitable material, such as cloth or the like about the upper and lower plates, and about the space between the plates so that if it is desired, the guard may be used for retaining any suitable type of animal scent for attracting bait, which guard is placed beneath the pan of an ordinary steel trap, when the trap is set so that the packing of the dirt over the trap will not hinder the operation of the trap, in that the pan will be yieldably supported by the guard, and the guard will also prevent dirt from getting beneath the pan.

With the foregoing and other objects in view, this invention consists in such novel features of construction, combination and arrangement of parts as will be hereinafter more fully described, illustrated in the accompanying drawing and claimed.

In describing the invention in detail, reference will be had to the accompanying drawing wherein like characters designate like and corresponding parts throughout the several views, and in which:—

Figure 1 is a sectional view through a steel trap showing the improved guard in operation.

Fig. 2 is a top plan view of the guard.

Fig. 3 is a bottom plan view of the guard, and

Fig. 4 is a vertical section through the guard taken on the line 4—4 of Fig. 2.

Referring more particularly to the drawing, 1 designates an ordinary steel trap, and 2 designates the trip pan of the same.

The numeral 3 indicates the supporting arm for the trip pan which is positioned directly beneath the same, and which is bolted to the main body 4 of the trap in the usual manner, by a bolt as indicated in dotted lines at 5.

The guard, which is generically indicated by the numeral 6 is placed upon the upper surface of the arm 3 directly beneath the pan 2 and it is provided for supporting the pan 2 and preventing dirt from being packed beneath the pan during the setting of the trap.

The guard 6 comprises an upper plate 7 and a lower plate 8 which are covered with fabric coatings as indicated at 9 and which are also connected by a strip of fabric 10. A spring 11 is attached to the inner surfaces of the plates 7 and 8 and it has an angularly disposed portion 12 which extends from one of the plates to the other, for yieldably holding the plates in spaced relation as clearly shown in Fig. 4 of the drawing.

When the trap is set, and an animal strikes the pan 2 with its foot, it will force the pan downwardly, and spring the trap, as is ordinary in the operation of steel traps. The downward pressure on the pan 2 will compress the angular portion of the spring 12, allowing the upper plate 7 to move toward the lower plate 8.

The lower plate 8 is provided with an opening 14, which is adapted for receiving the head of the bolt 5, for properly positioning the guard structure 6, and for holding it in its proper position against accidental movement. The upper plate 7 of the guard structure is provided with an opening 15, by means of which bait, or any suitable type of animal scent, as usually employed in trapping animals such as coyotes, bob or wild-cats, or the like may be inserted.

In reducing the invention to practice, certain minor features of construction, combination and arrangement of parts may necessitate alterations to which the patentee is entitled provided such alterations are comprehended within the scope of what is claimed.

What is claimed is:—

1. The combination with an ordinary steel trap including a trip pan, of a yieldable guard positioned beneath said pan for preventing the accumulation of foreign material beneath the pan.

2. The combination with an ordinary steel trap including a trip pan, of a guard positioned beneath said pan, said guard being yieldable to permit of the depression of said pan for tripping the trap, said guard provided with substantially vertical side walls for preventing the accumulation of foreign material beneath the pan, and means for preventing accidental displacement of said guard.

3. The combination with an ordinary steel trap including a trip pan, of a substantially cylindrical yieldable guard positioned beneath said trip pan for preventing the accumulation of foreign material beneath the pan, said guard composed of an upper plate, a lower plate, a spring attached to said plates for holding them in spaced relation to each other, a fabric coating mounted about said plates and extending from the edge of one plate to the edge of the other plate for preventing foreign material entering between the plates, said bottom plate being provided with an opening for receiving a bolt carried by the steel trap for preventing accidental displacement of the guard when positioned beneath the trip pan of the trap.

In testimony whereof I affix my signature in presence of two witnesses.

FREDERICK R. MERRITT.

Witnesses:
W. B. FRISBIE,
ISABELLE JOSEPH.

Copies of this patent may be obtained for five cents each, by addressing the "Commissioner of Patents, Washington, D. C."